(12) United States Patent
Aguilar et al.

(10) Patent No.: US 11,560,922 B2
(45) Date of Patent: Jan. 24, 2023

(54) JOURNAL FOIL BEARING SYSTEM WITH FOIL SUPPORT INSERT MEMBER

(71) Applicant: Garrett Transportation I Inc, Torrance, CA (US)

(72) Inventors: Scott Aguilar, La Crescenta, CA (US); Luca Tabacchi, Redondo Beach, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 17/301,728

(22) Filed: Apr. 13, 2021

(65) Prior Publication Data

US 2022/0325745 A1 Oct. 13, 2022

(51) Int. Cl.
*F16C 17/02* (2006.01)
*F16C 35/02* (2006.01)

(52) U.S. Cl.
CPC .......... *F16C 17/024* (2013.01); *F16C 35/02* (2013.01)

(58) Field of Classification Search
CPC .................................................. F16C 17/024
See application file for complete search history.

(56) References Cited

U.S. PATENT DOCUMENTS

| 5,634,723 | A | * | 6/1997 | Agrawal | F16C 17/024 384/106 |
| 6,964,522 | B2 | | 11/2005 | Kang et al. | |
| 8,353,631 | B2 | * | 1/2013 | Kim | F16C 43/02 384/106 |
| 8,371,799 | B2 | * | 2/2013 | Spathias | F16C 43/02 416/174 |
| 9,057,401 | B2 | | 6/2015 | Saville et al. | |
| 9,556,899 | B2 | | 1/2017 | Saville et al. | |
| 9,568,042 | B2 | * | 2/2017 | Omori | F16C 17/024 |
| 9,989,085 | B2 | | 6/2018 | Saville et al. | |

FOREIGN PATENT DOCUMENTS

| CN | 111795062 A | 10/2020 |
| EP | 2942537 A1 | 11/2015 |

* cited by examiner

*Primary Examiner* — James Pilkington
(74) *Attorney, Agent, or Firm* — Lorenz & Kopf, LLP (57) ABSTRACT

A journal foil bearing system includes a journal member with a bore and an internal groove. The system includes a shaft received within the bore and supported for rotation relative to the journal member about an axis. The groove extends substantially along the axis. The system also includes at least one biasing foil and a top foil member with at least one arch-bound top foil. The top foil member has a top foil first end and a top foil second end. Additionally, the system includes a foil support insert member that is received within the groove. The foil support insert member includes a spacer member that is disposed between the top foil first and second ends. The spacer member maintains the top foil first and second ends separated, at least, at a distance.

20 Claims, 8 Drawing Sheets

JOURNAL FOIL BEARING SYSTEM WITH FOIL SUPPORT INSERT MEMBER

TECHNICAL FIELD

The present disclosure generally relates to bearing systems and, more particularly, relates to a journal foil bearing system with a foil support insert member.

BACKGROUND

Various bearing systems are provided for supporting rotation of a shaft within a housing. For example, turbomachines (e.g., turbochargers, superchargers, and other compressor devices) may include one or more air bearings. These bearings preferably support efficient rotation of the shaft, across a wide range of operating conditions, and throughout a long operating lifetime.

Some devices include foil bearing systems (i.e., journal foil bearing systems, foil-air bearing systems, air foil journal bearing, etc.). These bearings include one or more foils that are radially disposed between the shaft and the housing, wherein the foil(s) exert an inwardly directed radial pre-load against the shaft when at-rest. The lift-off speed of the bearing is affected by the amount of pre-load applied to the shaft. Furthermore, wear of the bearing is affected by the amount of applied pre-load. Also, the foil(s) are preferably stiff enough to provide acceptable roto-dynamic behavior/shaft motion control throughout the operating speed range of the shaft.

However, tailoring and controlling these factors for conventional foil bearing systems remains challenging. For example, it can be difficult to control certain dimensions of the bearing components, which can cause the pre-load of the foil bearing to be unacceptable. Manufacture of these bearing systems can also be inefficient due to difficulty in controlling these dimensions, due to a large part count, due to assembly difficulties, and/or for other reasons.

Thus, it is desirable to provide a foil bearing system that allows for more precise and selective control of the pre-load that the system applies to the shaft when at-rest. It is also desirable to provide a foil bearing system that provides manufacturing efficiencies. Other desirable features and characteristics of the present disclosure will become apparent from the subsequent detailed description and the appended claims, taken in conjunction with the accompanying drawings and this background discussion.

BRIEF SUMMARY

In one embodiment, a journal foil bearing system is disclosed that includes a journal member with a bore and an internal groove within the bore. The bearing system also includes a shaft received within the bore and supported for rotation relative to the journal member about an axis. The groove extends substantially along the axis. Furthermore, the bearing system includes at least one biasing foil that is received radially between the journal member and the shaft and that extends circumferentially about the axis. Also, the bearing system includes a top foil member with at least one arch-bound top foil received radially between the at least one biasing foil and the shaft. The top foil member includes a top foil first end and a top foil second end. Moreover, the bearing system includes a foil support insert member that is received within the groove. The foil support insert member includes a spacer member that is disposed between the top foil first end and the top foil second end. The spacer member maintains the top foil first end and the top foil second end separated, at least, at a distance.

In another embodiment, a turbomachine is disclosed that includes a housing, a rotating group that includes a shaft, and a journal foil bearing system that supports the shaft for rotation within the housing. The journal foil bearing system includes a journal member that is fixed to the housing. The journal member has a bore and an internal groove within the bore. The shaft is received within the bore and is supported for rotation relative to the journal member about an axis. The groove extends substantially along the axis. The bearing system also includes at least one biasing foil that is received radially between the journal member and the shaft and that extends circumferentially about the axis. Moreover, the bearing system includes a top foil member with at least one arch-bound top foil received radially between the at least one biasing foil and the shaft. The top foil member includes a top foil first end and a top foil second end. Furthermore, the bearing system includes a foil support insert member that is received within the groove. The foil support insert member includes a spacer member that is disposed between the top foil first end and the top foil second end. The spacer member maintains the top foil first end and the top foil second end separated, at least, at a distance.

In an additional embodiment, a method of manufacturing a journal foil bearing system is disclosed that includes receiving a shaft within a bore of a journal member. The shaft has an axis, and the bore has an internal groove. The method also includes disposing at least one biasing foil radially between the journal member and the shaft and extending the at least one biasing foil circumferentially about the axis. Moreover, the method includes providing a top foil with a first end, a second end, and an intermediate portion that extends circumferentially about the axis between the first end and the second end, including disposing the intermediate portion radially between the at least one biasing foil and the shaft. Additionally, the method includes inserting a foil support insert member within the groove. The foil support insert member includes a spacer member. The method further includes disposing the spacer member between the first end and the second end of the top foil to maintain the first end and the second end separated, at least, at a distance.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved foil bearing system that allows for more precise and selective control of the pre-load that the system applies to the shaft when at-rest. The foil bearing system of the present disclosure also includes a relatively low part count and is relatively easy to manufacture and assemble. As such, the foil bearing system of the present disclosure provides a number of manufacturing efficiencies.

In some embodiments, the foil bearing system includes at least one biasing foil and a top foil that is radially disposed the biasing foil(s) and the shaft. The biasing foil(s) provide a radially-inward directed biasing force toward the shaft. Also, the top foil may be supported in an arch-bound condition, wherein the top foil may exert a load in the circumferential direction to retain the top foil against the shaft when the shaft is at rest. The foil bearing system may include a foil support insert member that is received within a groove of the journal member. The foil support insert member may abut a first end and a second end of the top foil to space the ends apart and provide the arch-bound configuration of the top foil when the shaft is at-rest. The insert member may maintain separation between the first and the second end such that the top foil exerts a known, selected pre-load on the shaft. The insert member may have a number of different features and configurations for providing the selected pre-load to the shaft as will be discussed.

Accordingly, the journal foil bearing system of the present disclosure provides adequate operational spring stiffness while limiting the amount of bearing pre-load when the shaft is at-rest. Additionally, manufacture and assembly of the journal foil bearing system may be performed efficiently, accurately, and repeatably.

Figure 1:
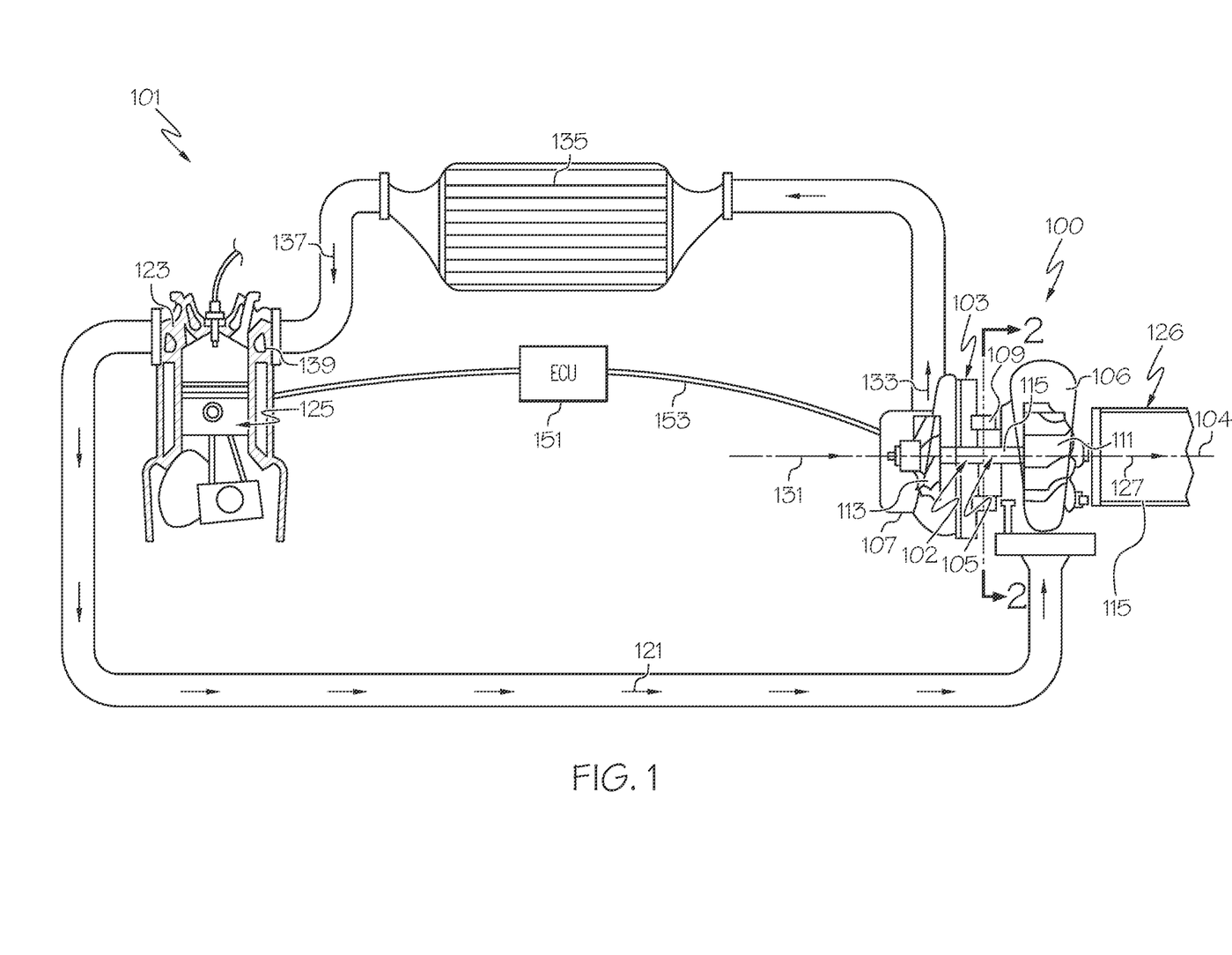
FIG. 1 is a schematic illustration of an engine system with a turbocharger that includes a bearing system according to example embodiments of the present disclosure.

FIG. 1 is a schematic view of an example turbomachine, such as a turbocharger 100 that is incorporated within an engine system 101. The turbocharger 100 may include one or more features of the present disclosure. It will be appreciated that the turbocharger 100 could be another turbomachine, such as a supercharger, a compressor device, an electric-motor-driven turbomachine, etc. in additional embodiments of the present disclosure. Furthermore, the turbomachine of the present disclosure may be incorporated into a number of systems other than an engine system without departing from the scope of the present disclosure.

The turbocharger 100 may include a housing 103 and a rotating group 102, which is supported within the housing 103 for rotation about an axis 104 by a bearing system 105. The bearing system 105 may include and/or define at least one air journal foil bearing as will be discussed.

As shown in the illustrated embodiment, the housing 103 may include a turbine housing 106, a compressor housing 107, and a bearing housing 109. The bearing housing 109 may be disposed between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the bearing housing 109, to connect the turbine wheel 111 to the compressor wheel 113. Accordingly, the turbine wheel 111 and the compressor wheel 113 rotate together as a unit about the axis 104.

The turbine housing 106 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

Figure 2:
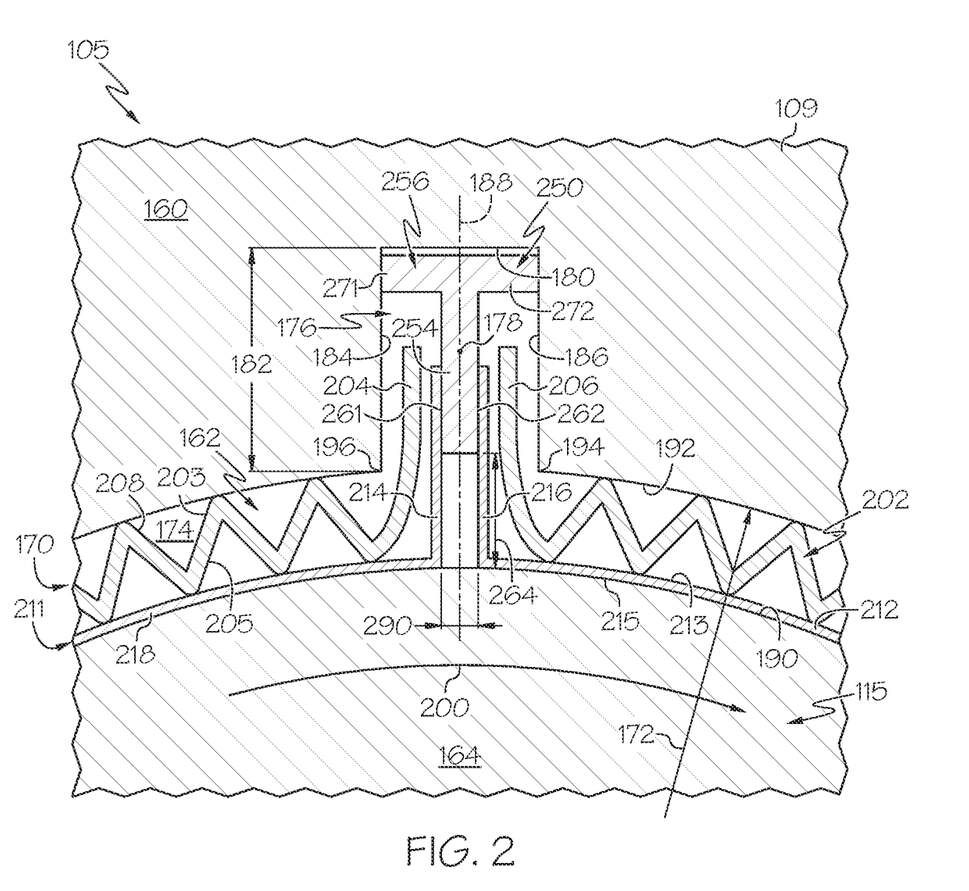
FIG. 2 is a cross sectional view of a foil bearing system of the turbocharger of FIG. 1 taken along the line 2-2 according to example embodiments of the present disclosure.

Referring now to FIG. 2, the bearing system 105 will be discussed in greater detail according to example embodiments. As shown, the bearing system 105 (i.e., bearing arrangement) may be a journal foil bearing system. The bearing system 105 may generally include a journal member 160 with a bore 162 that receives a segment 164 of the shaft 115. The bearing system 105 may also generally include a foil arrangement 170 disposed radially between the journal member 160 and the segment 164 of the shaft 115. The foil arrangement 170 may include one or more foils that support the shaft 115 for rotation relative to the journal member 160 as will be discussed.

The journal member 160, in some embodiments, may be fixed relative to (e.g., attached to) a surrounding portion of the bearing housing 109 (FIG. 1). The journal member 160 may be integrally attached to another portion of the bearing housing 109. The journal member 160 may an inner area of the bearing housing 109 with the bore 162 extending therethrough. The bore 162 may have a circular cross section with a radius 172 that is slightly larger than that of the segment 164 of the shaft 115. Accordingly, an annular gap 174 may be defined between an outer diameter surface 190 of the shaft 115 and an inner diameter surface 192 of the journal member 160. The gap 174 may receive the foil arrangement 170. The gap 174 may be dimensioned according to the size, spring stiffness, and/or other characteristics provided by the foil arrangement 170.

The journal member 160 may also include an internal groove 176. The groove 176 may be elongate and may extend along the axis of rotation 104 the shaft 115, and the groove 176 may be recessed into the inner diameter surface 192 of the bore 162. In some embodiments, the groove 176 may have a longitudinal axis 178 that is substantially parallel to the axis of rotation 104 (FIG. 1). The groove 176 may maintain a constant cross sectional profile along a majority of the length of the journal member 160 (e.g., a constant cross section along an entirety of the length of the journal member 160). Also, the groove 176 may be defined by a plurality of substantially flat surfaces that extend along the longitudinal axis 178. In some embodiments, the groove 176 may be defined by a substantially flat recessed surface 180, which defines a depth dimension 182 of the groove 176. In other words, the depth dimension 182 may be measured radially from the inner diameter surface 192 to the recessed surface 180. The groove 176 may also be defined by a substantially flat first side surface 184 and a substantially flat second side surface 186. The first and second side surfaces 184, 186 may be parallel and spaced apart from a radial reference plane (indicated by line 188), which extends through the longitudinal axis 178 and the axis of rotation 104 of the rotating group 102 (FIG. 1). Thus, the groove 176 may have a substantially rectangular cross section as shown in FIG. 2. Also, the cross section may be substantially symmetrical with respect to the radial plane 188. Accordingly, the groove 176 may include a first side 194 and a second side 196 that are symmetrical with respect to the radial plane 188. The transition between the first side 194 of the groove 176 and the inner diameter surface 192 may have any suitable shape, profile, etc. This transition may be convexly rounded at a suitable radius, for example. The transition between the second side 196 of the groove 176 and the inner diameter surface 192 may be similarly shaped.

It will be appreciated that the groove 176 may be highly convenient to make and manufacture. This groove 176 may be machined easily within the bore 162. For example, in some embodiments, the groove 176 may be machined with a broaching tool. There may be a high degree of space and access to form the bore 162. Also, the flat surfaces 180, 184, 186 of the groove 176 can be formed relatively easily and also machined to high tolerances.

The shaft segment 164 may have a circular cross section. The outer diameter surface 190 may be smooth and centered about the axis 104. The shaft segment 164 may be integrally attached to both axial ends of the shaft 115 for integrally attaching the rotating group 102 within the turbine section and the compressor section of the turbocharger 100. The shaft segment 164 may be supported for rotation in the clockwise direction (as indicated by arrow 200) in the perspective of FIG. 2.

The foil arrangement 170 may include at least one biasing foil 202 and a top foil member 211. The top foil member 211 may include at least one arch-bound top foil 212. The biasing foil(s) 202 and the top foil(s) 212 may be thin, sheet-like members that wrap and extend at least partly about the shaft segment 164 in the circumferential direction about the axis 104. The foil arrangement 170 may be received partly within the gap 174 and partly within the groove 176. The foil arrangement 170 is shown in FIG. 2 in a state in which the shaft 115 is at rest; however, as will be discussed, the foil arrangement 170 may resiliently flex to accommodate and support rotation of the shaft 115.

The biasing foil 202 (i.e., spring foil, spring foil arrangement, etc.) within the foil arrangement 170 may include a plurality of flexible and resilient foils that are arranged end-to-end about axis 104. The biasing foil 202 may include a first end 204 and a second end 206, and an intermediate portion 208 that extends circumferentially between the first and second ends 204, 206. The intermediate portion 208 may be rippled, corrugated, wavy, or otherwise patterned. The intermediate portion 208 may be radially disposed between the journal member 160 and the top foil 212. More specifically, the peaks of an outer radial side 203 of the biasing foil 202 may abut against the inner diameter surface 192 of the journal member 160, whereas the valleys of an inner radial side 205 of the biasing foil 202 may abut against the top foil 212. The first and second ends 204, 206 may project radially and may be received within the groove 176 of the journal member 160.

In some embodiments, there may be a single arch-bound top foil 212 in the foil arrangement 170. Thus, the top foil 212 may include a first end 214, a second end 216, and an intermediate portion 218 that extends circumferentially between the first and second ends 214, 216. The intermediate portion 218 may be rounded and may follow a substantially circular path. The intermediate portion 218 may be radially disposed between the biasing foil 202 and the outer diameter surface 190 of the shaft segment 164. As stated, the valleys of the rippled biasing foil 202 may abut an outer radial side 213 of the top foil 212. An inner radial side 215 of the top foil 212 may layer over and abut against the outer diameter surface 190 of the shaft segment 164. The first and second ends 214, 216 may project radially and may be received within the groove 176 of the journal member 160.

The bearing system 105 may further include a foil support insert member 250 (i.e., insert member). The insert member 250 may be elongate with a straight longitudinal axis that extends along the longitudinal axis 178. The foil support insert member 250 may be rigid and strong. In some embodiments, the foil support insert member 250 may be made of metal. In additional embodiments, the foil support insert member 250 may be made of a polymeric material or a composite material. The foil support insert member 250 may be formed via extrusion, forging, machining, or other manner.

The foil support insert member 250 may have a variety of shapes, sizes, dimensions, etc. without departing from the scope of the present disclosure. In some embodiments, the foil support insert member 250 may have a polygonal cross section and may be collectively defined by a plurality of flat sides. The insert member 250 may have a T-shaped cross section taken normal to the axis of rotation 104 and the longitudinal axis 178. This cross section may remain substantially constant along a majority of the length of the insert member 250 (i.e., along the axis 178). As such, the foil support insert member 250 may include a spacer member 254 that extends radially and a tangential portion 256 that extends tangentially. The spacer member 254 may include a first side surface 261 and a second side surface 262. The first side surface 261 and the second side surface 262 may be substantially flat and may be parallel to each other, facing in opposite tangential directions away from each other. The spacer member 254 may also define an inner radial edge 264 of the insert member 250, which runs along the outer diameter surface 190 of the shaft segment 164, and which is spaced apart radially therefrom. The tangential portion 256 may be attached to the outer radial end of the spacer member 254 with a first leg 271 and a second leg 272, which extend normal to the spacer member 254 in opposite tangential directions. In some embodiments, the T-shaped cross section of the foil support insert member 250 may be substantially symmetric about the radial plane 188. Accordingly, the spacer member 254 may be centered on the radial plane 188, and the tangential portion 256 may project away equal distances from the opposite sides of the spacer member 254. The tangential portion 256 may extend normal to the radial plane 188 and, thus, tangentially relative to the axis of rotation 104.

The insert member 250 may be received within and may subdivide the groove 176. The tangential portion 256 may extend tangentially within the groove 176 to extend between the first and second side surfaces 184, 186 and may loosely fit therein. This fit may permit manual insertion of the insert member 250 within the groove 176. The spacer member 254 may be at least partly received in the groove 176 as well.

Also, the spacer member 254 may be disposed between the first end 214 and the second end 216 of the top foil 212. The first end 214 of the top foil 212 may be layered flat upon and may abut the first side surface 261, and/or the second end 216 of the top foil 212 may be layered flat upon and may abut the second side surface 262 of the spacer member 254. Thus, the spacer member 254 may maintain the first and second ends 214, 216 spaced apart, at least, at a distance (e.g., a tangential distance 290) that is equal to the thickness of the spacer member 254. The ends 214, 216 may be biased toward each other in the tangential and/or circumferential direction; however, the spacer member 254 may push the first and second ends 214, 216 away from each against this biasing force. This load from the spacer member 254 may cause the top foil 212 to be arch-bound within the foil arrangement 170.

It will be appreciated that the first side surface 261 and the second side surface 262 may define respective control surfaces for supplying the load to the top foil 212. These surfaces 261, 262 may be formed with precision and to high tolerances to maintain the first and second ends 214, 216 at a predetermined distance. Thus, the arch-loading on the top foil 212 (which contributes to the preload applied to the shaft segment 164) may be selectively and precisely controlled. Also, because the insert member 250 may be removably received within the groove 176, the insert member 250 may be removed and replaced with another. The thickness of the spacer member 254 (equal to the distance 290) may be changed by replacing the insert member 250 to thereby change the arch-loading to the top foil 212.

The inner radial edge 264 may also be disposed in close radial proximity to the outer diameter surface 190 of the shaft 115. Accordingly, the point of contact with the top foil 212 may be in close proximity to the outer diameter surface 190. In other words, a radial dimension 275 from the outer diameter surface 190 to the point of contact (and the resulting moment arm) may be relatively small. Also, the spacer member 254 may be removed and replaced with another having different dimensions to control the moment arm represented by the radial dimension 275. This radial dimension 275 may be controlled to affect (e.g., to minimize) the moment arm for the foil arrangement 170.

As mentioned, the foil arrangement 170 shown in FIG. 2 may represent a condition at which the shaft 115 is at-rest. The arch-bound top foil 212 may supply the selected radial pre-load to the shaft 115. As the shaft 115 begins to rotate (e.g., in the clockwise direction along arrow 200), air pressure may cause the second end 216 (i.e., the leading end of the top foil 212) to lift away from the second side surface 262 while the first end 214 remains layered on the first side surface 261. As the angular velocity of the shaft 115 increases further, the top foil 212 may expand radially outward against the biasing force of the biasing foil 202 and lift-off the shaft 115 such that a thin film of air supports shaft rotation. As the shaft 115 decelerates, the biasing foil 202 and the top foil 212 may resiliently return to the state shown in FIG. 2.

In the embodiment of FIG. 2, the top foil member 211 of the foil arrangement 170 includes a single, unitary arch-bound top foil 212 with ends 214, 216 that are separated and spaced apart by the spacer member 254 of the insert member 250. However, there may be other embodiments of the top foil member 211. In additional embodiments of the top foil member 211, there may be a plurality, or series, of top foils 212, and the top foils 212 may each include a respective first end 214 and a respective second end 216. In these embodiments, there may be a plurality insert members 250 included, and the respective spacer members 254 may be disposed between neighboring pairs of first and second ends 214, 216 of the top foils 212 such that the series of top foils 212 is arch-bound.

Figure 3:
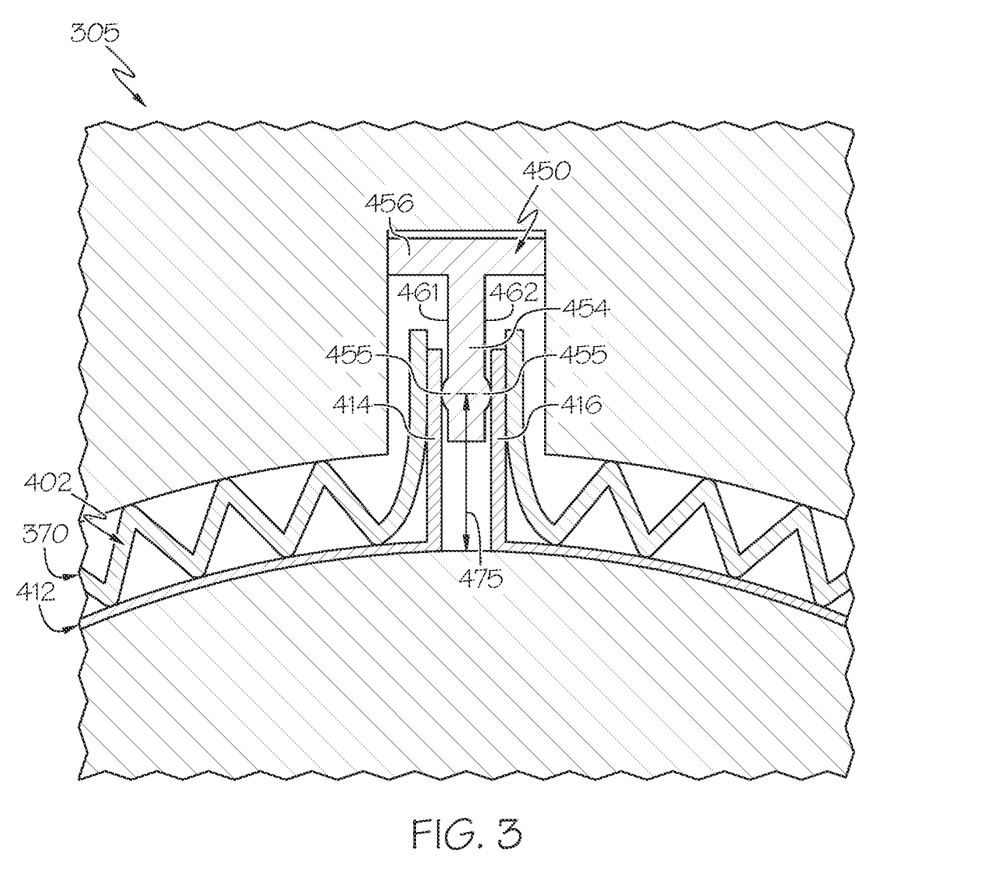
FIG. 3 is a cross sectional view of the foil bearing system according to additional example embodiments of the present disclosure.

Referring now to FIG. 3, the bearing system 305 is illustrated according to additional example embodiments of the present disclosure. The bearing system 305 may be similar to the bearing system 105 of FIGS. 1 and 2 except as noted. Components that correspond to those of FIGS. 1 and 2 are indicated with corresponding reference numbers increased by 200.

The foil arrangement 370 may be substantially similar to the embodiments discussed above and may include a biasing foil 402 and a top foil 412. The foil support insert member 450 may be T-shaped with a radial spacer member 454 and a tangential portion 456. The insert member 450 may also include at least one projection 455. As shown in FIG. 3, the insert member 450 may include two projections 455. The projections 455 may project tangentially from respective ones of the first and second side surfaces 461, 462. The projections 455 may be rounded, convex bumps as shown. In additional embodiments, at least one of the projections 455 may project from the spacer member 454 and may terminate at a substantially flat surface.

The first end 414 of the top foil 412 may overlap and abut one of the projections 455, and the second end 416 may overlap and abut the other projection 455, thereby loading the top foil 412 so that it is arch-bound. The projections 455 may be included to control the radial dimension 475 of the applied load and, thus, the moment arm of the foil arrangement 370.

Figure 4A:
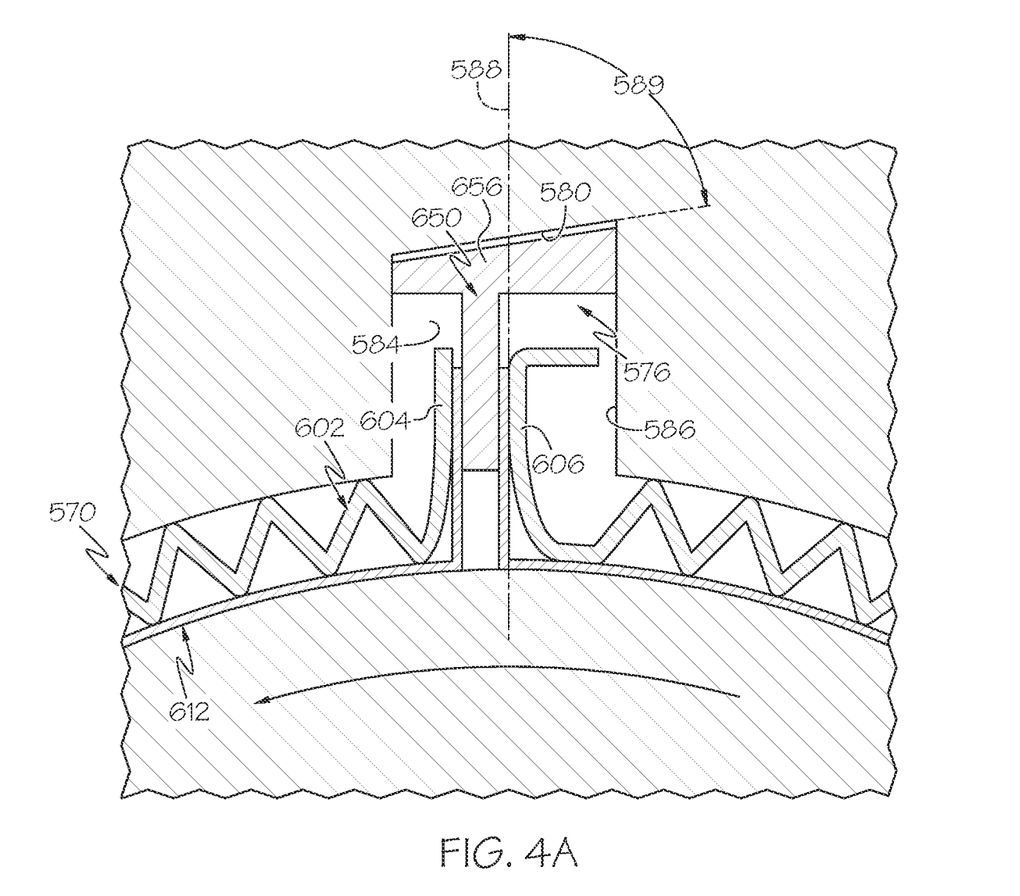
FIG. 4A is a cross sectional view of the foil bearing system according to additional example embodiments of the present disclosure.

Referring now to FIG. 4A, the bearing system 505 is illustrated according to additional example embodiments of the present disclosure. The bearing system 505 may be similar to the bearing system 105 of FIGS. 1 and 2 except as noted. Components that correspond to those of FIGS. 1 and 2 are indicated with corresponding reference numbers increased by 400.

The foil arrangement 570 may be substantially similar to the embodiments discussed above and may include a biasing foil 602 and a top foil 612. The foil support insert member 650 may be T-shaped with a radial spacer member 654 and a tangential portion 656.

As shown, the insert member 650 may have an asymmetrical cross section with respect to the radial plane 588 and/or the groove 576 may be asymmetrical with respect to the radial plane 588. Both are asymmetrical in the illustrated embodiment, and this facilitates assembly since the insert member 650 may be installed in a single orientation.

In some embodiments, the spacer member 654 may be disposed to one side of the radial plane 588, and the tangential portion 656 may be wedge-shaped or triangular, thereby making the spacer member 654 asymmetrical. Furthermore, in some embodiments, the groove 576 may be defined by flat first and second side surfaces 584, 586, and the recessed surface 580 may be disposed at a non-normal angle 589 relative to the radial plane 588, thereby making the groove 576 asymmetrical.

This asymmetrical insert member 650 and groove 576 may be useful, for example, when the biasing foil 602 has an asymmetrical arrangement (e.g., when using a biasing foil 602 with a specific direction of rotation). For example, as shown in FIG. 4A, the first end 604 of the biasing foil 602 may extend radially similar to the embodiments of FIG. 2; however, the second end 606 of the biasing foil 602 may be bent tangentially away from the spacer member 654 as shown. Because of its asymmetry, the insert member 650 provides adequate room for the bent second end 606 on just one side of the spacer member 654. Accordingly, the asymmetrical insert member 650 may provide one-way installation of the foil arrangement 570 and the spacer member 654 and may, thus, facilitate assembly.

Figure 4B:
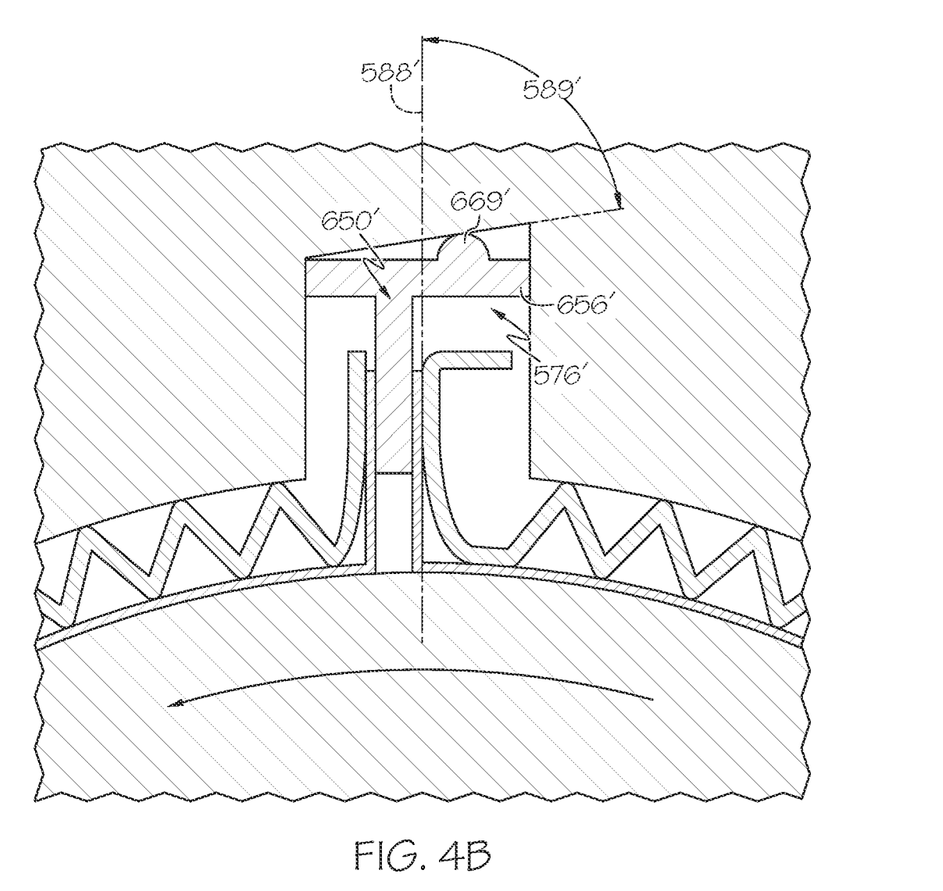
FIG. 4B is a cross sectional view of the foil bearing system according to additional example embodiments of the present disclosure.

FIG. 4B illustrates additional embodiments of the asymmetrical insert member 650' and groove 576'. The groove 576' may include the recessed surface 580', which is disposed at an angle 589' relative to the radial plane 588'. Also, the radial spacer member 654' may be disposed to one side of the radial plane 588'. The tangential portion 656' may extend substantially in the tangential direction relative to the radial plane 588', and the tangential portion 656' may additionally include a projection 669'. The projection 669' may be a bump, spine, rail, or other radially-extending body that projects outward radially from the tangential portion 656' to abut against the recessed surface 580'. Accordingly, the embodiments represented in FIG. 4B may also facilitate assembly as discussed above with respect to FIG. 4A.

Figure 5:
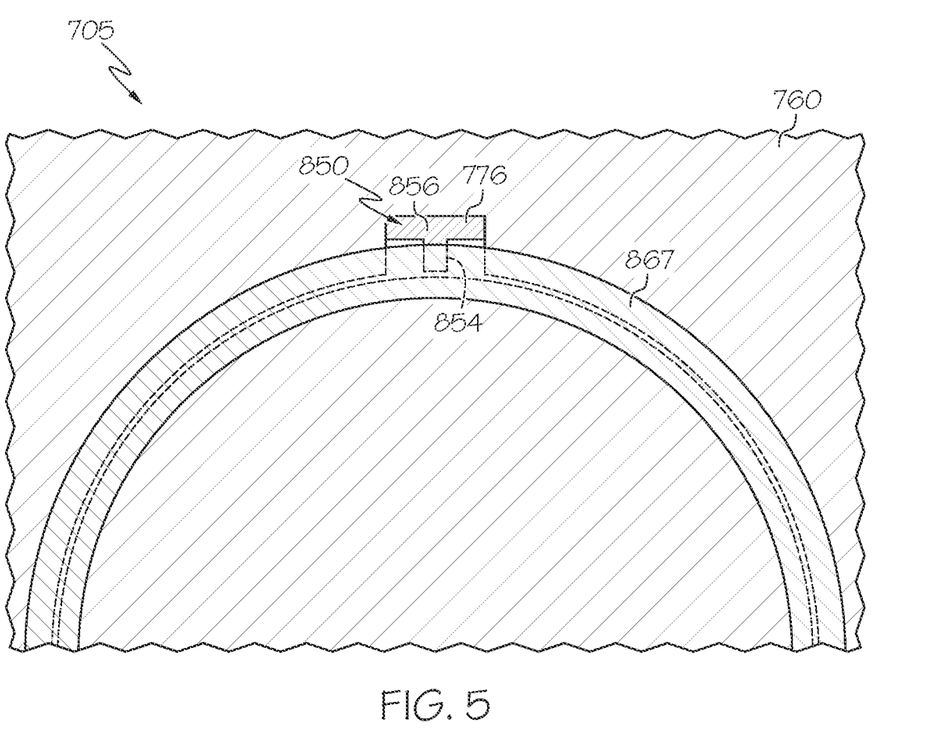
FIG. 5 is a cross sectional view of the foil bearing system according to additional example embodiments of the present disclosure.
Figure 6:
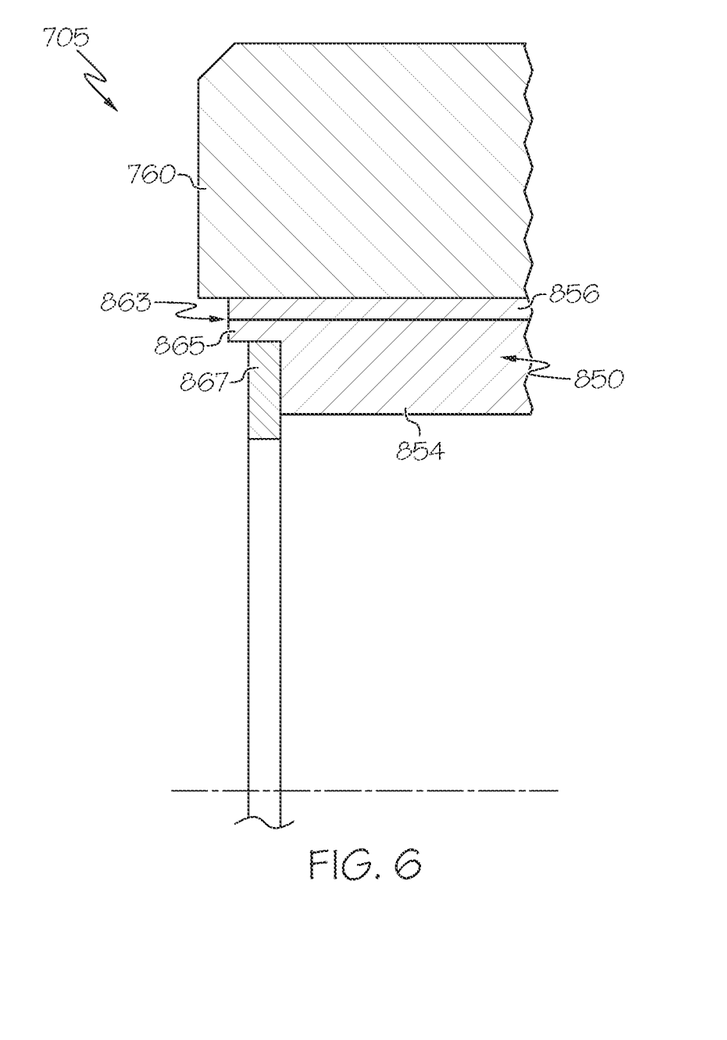
FIG. 6 is a longitudinal sectional view of the foil bearing system of FIG. 5.

Referring now to FIGS. 5 and 6, additional embodiments of the bearing system 705 are illustrated according to additional example embodiments of the present disclosure. The bearing system 705 may be similar to the bearing system 105 of FIGS. 1 and 2 except as noted. Components that correspond to those of FIGS. 1 and 2 are indicated with corresponding reference numbers increased by 600.

The bearing system 705 may include the T-shaped insert member 850, which includes the spacer member 854 and the tangential portion 856, similar to the embodiments discussed above. The insert member 850 may also be disposed within the internal groove 776 of the journal member 760. (The foil arrangement is hidden for clarity.) The insert member 850 may also include a longitudinal end 863 (FIG. 6). The longitudinal end 863 may include an axial projection 865. As shown in FIG. 6, the tangential portion 856 and part of the spacer member 854 may project axially from the longitudinal end 863 to define the axial projection 865.

The bearing system 705 may also include a retainer member 867. The retainer member 867 may be a flat, annular part that is centered on the axis of rotation 704. The retainer member 867 may engage the longitudinal end 863 to thereby retain the insert member 850 within the groove 776 in the axial and radial directions relative to the axis 704. For example, the retainer member 867 may abut the spacer member 854 to retain the insert member 850 in the axial direction, and the outer diameter edge of the retainer member 867 may abut against the opposing inner radial side of the projection 865 to retain the insert member 850 in the radial direction.

Figure 7:
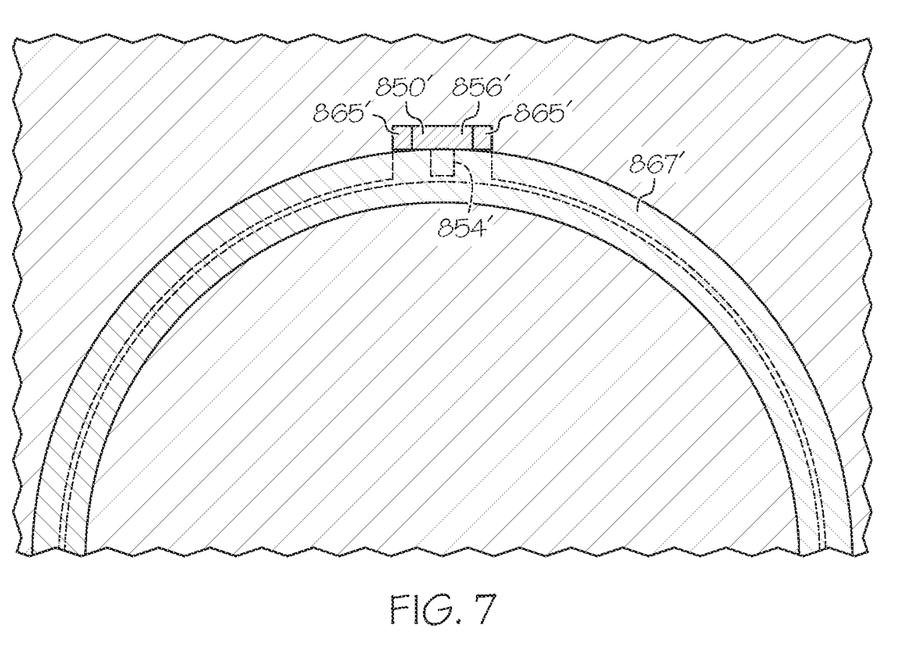
FIG. 7 is a cross sectional view of the foil bearing system according to additional example embodiments of the present disclosure.

FIG. 7 illustrates additional embodiments, which are similar to those of FIGS. 5 and 6. As shown in FIG. 7, there may be a plurality of projections 865' of the insert member 850'. As shown, the ends of the tangential portion 856' may project axially away from the spacer member 854' at the longitudinal end 863' so as to provide multiple (two) seating surfaces for the retainer member 867'. The retainer member 867' may abut against the spacer member 854' to retain the insert member 850' axially, and the retainer member 867' may abut the inner radial side of the tangential portion 856' to retain the insert member 850' in the radial direction.

The embodiments of FIGS. 5, 6, and 7 may provide the advantages discussed above with respect to FIGS. 1-4. In addition, the embodiments of FIGS. 5, 6, and 7 may further facilitate assembly of the bearing system 705. Furthermore, as detailed above, the various bearing systems of the present disclosure allow for increased precision and control for the bearing loads. These systems also increase manufacturing efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A journal foil bearing system comprising:
   a journal member with a bore and an internal groove within the bore;
   a shaft received within the bore and supported for rotation relative to the journal member about an axis, the groove extending substantially along the axis;
   at least one biasing foil that is received radially between the journal member and the shaft and that extends circumferentially about the axis;
   a top foil member received radially between the at least one biasing foil and the shaft, the top foil member including a top foil first end and a top foil second end; and
   a foil support insert member that is received within the groove, the foil support insert member including a spacer member that is disposed between the top foil first end and the top foil second end, the spacer member separating the top foil first end and the top foil second end so that the top foil first end and the top foil second end are maintained, at least, at a distance apart from one another.

2. The journal foil bearing system of claim 1, wherein the foil support insert member includes a first control surface and a second control surface that are substantially parallel and spaced apart, the first control surface abutting the top foil first end and the second control surface abutting the top foil second end.

3. The journal foil bearing system of claim 2, wherein the foil support insert member includes a tangential portion that extends tangentially with respect to a circle that is centered on the axis, the tangential portion being substantially normal to the first control surface and the second control surface.

4. The journal foil bearing system of claim 1, wherein the spacer member extends radially with respect to the axis; and wherein the foil support insert member includes a tangential portion that extends perpendicularly with respect to the spacer member.

5. The journal foil bearing system of claim 4, wherein the spacer member includes a projection that projects perpendicularly to the spacer member, the projection abutting one of the top foil first end and the top foil second end.

6. The journal foil bearing system of claim 1, wherein the foil support insert member includes a longitudinal end; and further comprising a retainer member that engages the longitudinal end to retain the foil support insert member in an axial direction and in a radial direction with respect to the axis.

7. The journal foil bearing system of claim 6, wherein the longitudinal end includes an axial projection; and wherein the retaining member abuts the axial projection to retain the foil support insert member.

8. The journal foil bearing system of claim 1, wherein the foil support insert member defines a line of symmetry, the line of symmetry extending radially with respect to the axis.

9. The journal foil bearing system of claim 1, wherein the foil support insert member has an asymmetrical cross section along a line normal to the axis.

10. The journal foil bearing system of claim 1, further comprising a compressor wheel that is supported on the shaft.

11. The journal foil bearing system of claim 1, wherein the internal groove has a longitudinal axis that is substantially parallel to the axis, and wherein the internal groove is defined by a plurality of substantially flat surfaces that extend along the longitudinal axis.

12. A turbomachine comprising:
a housing;
a rotating group that includes a shaft; and
a journal foil bearing system that supports the shaft for rotation within the housing, the journal foil bearing system including:
a journal member that is fixed to the housing, the journal member having a bore and an internal groove within the bore, the shaft received within the bore and supported for rotation relative to the journal member about an axis, the groove extending substantially along the axis;
at least one biasing foil that is received radially between the journal member and the shaft and that extends circumferentially about the axis;
a top foil member received radially between the at least one biasing foil and the shaft, the top foil member including a top foil first end and a top foil second end; and
a foil support insert member that is received within the groove, the foil support insert member including a spacer member that is disposed between the top foil first end and the top foil second end, the spacer member separating the top foil first end and the top foil second end so that the top foil first end and the top foil second end are maintained, at least, at a distance apart from one another.

13. The turbomachine of claim 12, further comprising a compressor section with a compressor wheel that is attached to the shaft, the compressor section configured to compress a compressible fluid flowing therethrough.

14. The turbomachine of claim 13, further comprising a turbine section with a turbine wheel that is attached to the shaft, the turbine wheel configured to be driven by a driving fluid flowing therethrough to thereby drivingly rotate the compressor wheel.

15. The turbomachine of claim 12, wherein the foil support insert member includes a first control surface and a second control surface that are substantially parallel and spaced apart, the first control surface abutting the top foil first end and the second control surface abutting the top foil second end.

16. The turbomachine of claim 12, wherein the spacer member includes a projection that projects perpendicularly to the spacer member, the projection abutting one of the top foil first end and the top foil second end.

17. The turbomachine of claim 12, wherein the foil support insert member includes a longitudinal end; and further comprising a retainer member that engages the longitudinal end to retain the foil support insert member in an axial direction and in a radial direction with respect to the axis.

18. The turbomachine of claim 12, wherein the foil support insert member defines a line of symmetry, the line of symmetry extending radially with respect to the axis.

19. The turbomachine of claim 12, wherein the foil support insert member has an asymmetrical cross section along a line normal to the axis.

20. A method of manufacturing a journal foil bearing system comprising:
receiving a shaft within a bore of a journal member, the shaft having an axis, the bore having an internal groove;
disposing at least one biasing foil radially between the journal member and the shaft, and extending the at least one biasing foil circumferentially about the axis;
providing a top foil with a first end, a second end, and an intermediate portion that extends circumferentially about the axis between the first end and the second end, including disposing the intermediate portion radially between the at least one biasing foil and the shaft;
inserting a foil support insert member within the groove, the foil support insert member including a spacer member; and
disposing the spacer member between the first end and the second end of the top foil to separate the first end and the second end so that the first end and the second end are maintained, at least, at a distance apart from one another.

\* \* \* \* \*